United States Patent [19]

Bosscher et al.

[11] Patent Number: 4,480,070

[45] Date of Patent: Oct. 30, 1984

[54] COMPOSITIONS AND PROCESS

[75] Inventors: Filippus Bosscher, Wagenborgen, Netherlands; John Penfold, Engelburg; Klaus W. Reich, Eggersriet, both of Switzerland; Albertus Zandvoort, Holwierde, Netherlands

[73] Assignee: The Upjohn Company, Kalamazoo, Mich.

[21] Appl. No.: 507,956

[22] Filed: Jun. 27, 1983

Related U.S. Application Data

[63] Continuation of Ser. No. 383,024, May 28, 1982, abandoned.

[51] Int. Cl.$^3$ .............................................. C08L 75/07
[52] U.S. Cl. ..................................... 524/591; 528/67; 528/76
[58] Field of Search ...................... 528/67, 76; 524/591

[56] References Cited

U.S. PATENT DOCUMENTS

| | | | |
|---|---|---|---|
| 3,996,154 | 12/1976 | Johnson | 252/312 |
| 4,055,548 | 10/1977 | Carleton | 528/67 |
| 4,110,397 | 8/1978 | Wooler | 264/338 |
| 4,115,429 | 9/1978 | Reiff | 528/67 |
| 4,125,545 | 11/1978 | Kroplinski | 528/76 |
| 4,260,532 | 4/1981 | Reuther | 260/29.6 HN |
| 4,261,852 | 4/1981 | Carroll | 528/67 |
| 4,365,025 | 12/1982 | Murch | 528/67 |
| 4,381,405 | 4/1983 | Takeuchi | 528/67 |

FOREIGN PATENT DOCUMENTS

| | | |
|---|---|---|
| 863291 | 1/1977 | Belgium . |
| 2921681 | 5/1979 | Fed. Rep. of Germany . |
| 2921726 | 5/1979 | Fed. Rep. of Germany . |

*Primary Examiner*—Paul R. Michl
*Attorney, Agent, or Firm*—Denis A. Firth; Robert A. Armitage

[57] ABSTRACT

Isocyanate compositions are disclosed which yield aqueous emulsions on admixture with water. The emulsions are sufficiently stable to permit employment as particle board binders and like uses. The compositions of the invention are derived by reaction of a polymethylene polyphenyl polyisocyanate with a particular group of polyethylene glycols which have been capped with a block of propylene oxide residues.

6 Claims, No Drawings

COMPOSITIONS AND PROCESS

This application is a continuation of Ser. No. 383,024 filed May 28, 1982 and now abandoned.

BACKGROUND OF THE INVENTION

1. Field of the Invention

This invention relates to isocyanate compositions and is more particularly concerned with emulsifiable polyisocyanates and with processes for their preparation and their use as binder for the preparation of particle board, hard board, foam scrap, wafer board and foundry cores.

2. Description of the Prior Art

The use of organic polyisocyanates, particularly polymethylene polyphenyl polyisocyanates, as binders or components of binders for the preparation of particle boards and like products is now widely recognized; see, for example, U.S. Pat. Nos. 3,428,592; 3,440,189; 3,557,263; 3,636,199; 3,870,665; 3,919,017; 3,930,110; and 4,257,995. In a particular mode of application the polyisocyanates have been used in the form of aqueous emulsions. The latter are applied, e.g. in the form of a spray, to the particles of wood or like cellulosic material which are employed to form the composite. The coated particles are then molded by subjecting them to the action of heat and pressure in order to prepare the final composite. In order to use the polyisocyanates in the form of aqueous emulsions in the above manner it is desirable that the emulsion be stable over a period of at least several hours and, preferably, several days. Thus, in commercial production of particle boards, there can be unscheduled interruptions in operations for a variety of reasons. If the aqueous emulsion utilized as the binder has only very limited stability, it is possible that a prolonged and unexpected interruption in the composite manufacturing process can result in deterioration of the binder emulsion to the point at which the latter has to be discarded in its entirety. The use of the term "stable" in the above context encompasses not only the maintenance of the emulsified state but the reaction, or rather lack of reaction, of the polyisocyanate with the water used in making the emulsion.

A number of aqueous emulsions of polyisocyanates have been described whose primary intended use is as binders for particle board. Illustratively, German Specification 2703271 describes the use of polyglycols having molecular weights from 4000 to 20,000 as emulsifying agents for polyisocyanates of which methylenebis(phenyl isocyanate) is specifically exemplified. U.S. Pat. No. 4,260,532 reports that the stability of the emulsions in the German specification can be improved by replacing a part or the whole of the polyglycol with a water-soluble polyamide such as polyvinylpyrrolidone.

U.S. Pat. No. 3,996,154 relates to the preparation of aqueous emulsions of polyisocyanates in which the emulsifying agent is derived by reaction of a minor amount of the polyisocyanate with the mono-loweralkyl ether of a polyethylene glycol. The emulsifying agent can be preformed or formed in situ by adding the polyethylene glycol ether to the bulk of the polyisocyanate. The polyisocyanate may be present as prepolymer obtained by reacting the polyisocyanate with a polyol. The emulsions prepared as described in the above reference are shown in U.S. Pat. No. 4,110,397 to be useful as binders in the preparation of particle board.

German Offenlegungsschrift 2,921,681 (and corresponding European application 19844) describes aqueous emulsions of polyisocyanate in which the emulsifying agent is the product of reaction of a polyisocyanate and a mono-alcohol which comprises a polyethylene glycol having one of its hydroxyl groups blocked or replaced by a variety of different groups none of which, with the sole exception of an epoxy group, is reactive with isocyanate. The companion German Offenlegungsschrift 2,921,726 (and corresponding European application 19860) describes the use of these emulsions as particle board binders.

We have now found that emulsifiable isocyanate compositions with advantageous properties can be prepared by reaction of polymethylene polyphenyl polyisocyanates with a particular group of derivatives of block copolymers of ethylene oxide and propylene oxide and that aqueous emulsions having advantageous properties can be obtained by dispersing said isocyanates in water.

SUMMARY OF THE INVENTION

This invention comprises isocyanate compositions capable of yielding an emulsion on admixture with water said compositions comprising the product of reaction of (a) a polymethylene polyphenyl polyisocyanate containing from about 10 to about 90 percent by weight of methylenebis(phenyl isocyanate) the remainder of said polyisocyanate comprising oligomers of functionality greater than 2.0;

(b) from 0.001 to 0.2 equivalents, per equivalent of said polyisocyanate, of a hydroxyl containing compound selected from the class consisting of at least one compound having the formula $$R^1\text{---}(CH_2CH_2O)_{3-25}\text{---}R^2 \qquad (I)$$

wherein $R^1$ represents a group selected from the class consisting of alkoxy, carbalkoxy, aryloxy, and

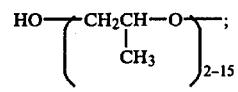

and $R^2$ represents a group having the formula

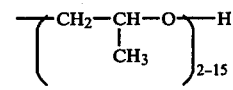

The invention also comprises the aqueous emulsions derived by dispersing said prepolymers in water. The invention also comprises a process for the preparation of particle boards using as the binder composition the aqueous emulsions derived from said prepolymers.

The term "alkoxy" means the group R—O—, the term "carbalkoxy" means the group,

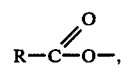

wherein in both cases R is alkyl from 1 to 20 carbon atoms, inclusive, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl and the like, including isomeric forms thereof.

The term "aryloxy" means the group R'—O— wherein R' is aryl, i.e. the radical obtained by removing one hydrogen atom from a nuclear carbon atom of an aromatic hydrocarbon. Illustrative of aryl are phenyl, naphthyl, biphenylyl and alkyl substituted phenyl such as tolyl, xylyl, butylphenyl, octylphenyl, nonylphenyl, decylphenyl, octadecylphenyl and the like.

DETAILED DESCRIPTION OF THE INVENTION

The polyisocyanate compositions of the invention are conveniently prepared by bringing together the polyisocyanate and the glycol or derivative in the appropriate proportions set forth above. The reaction can be carried out at ambient temperatures (of the order of 20° C. ) but is preferably carried out at elevated temperatures up to about 75° C. or higher in order that the reaction can be completed in a relatively short period of time. The progress of the reaction can be followed, if desired, by routine analytical procedures such as infrared spectroscopy and the like or by following the change in viscosity of the reaction mixture. The end point of the reaction is generally signalled by the lack of any further increase in viscosity of the reaction mixture. Depending upon the particular combination of polyisocyanate and hydroxyl-containing compound used and on the relative proportions in which they are employed, the viscosity of the prepolymer obtained will generally lie within the range of about 50 to about 5000 centipoises at 25° C. Preferably the viscosity of the prepolymers prepared in accordance with the invention lies within the range of about 200 to about 1500 centipoises at 25° C.

The polymethylene polyphenyl polyisocyanates which are employed in preparing the above compositions contain from about 10 to about 90 percent by weight of methylenebis(phenyl isocyanate) the remainder of the mixture being polymethylene polyphenyl polyisocyanates having a functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 105° C. to about 300° C., until the viscosity (at 25° C.) has increased to a value within the range of about 800 to 3000 centipoises. Another modified polymethylene polyphenyl polyisocyanate is one which has been treated with minor amounts of an epoxide to reduce the acidity thereof in accordance with U.S. Pat. No. 3,793,362.

Particularly preferred polymethylene polyphenyl polyisocyanates are those which contain from about 25 to about 65 percent by weight of methylenebis(phenyl isocyanate) the remainder of the mixture being oligomeric polymethylene polyphenyl polyisocyanates of functionality higher than 2.0.

The hydroxyl-containing compounds which are employed in the preparation of the isocyanate compositions of the invention are those represented by the various formulae above. Said hydroxyl-containing compounds encompass the following types:

(i) Compounds having the formula:

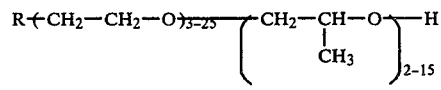

where R is selected from the class consisting of aryloxy, alkoxy or carbalkoxy, wherein the alkyl moiety of the alkoxy group or carbalkoxy group contains 1 to 20 carbon atoms as discussed and exemplified above; and (ii) Compounds having the formula:

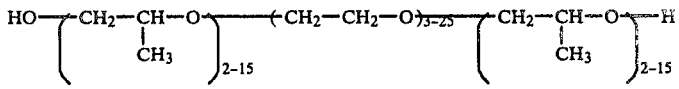

As will be seen from the above formulae each of the compounds contains a block of ethylene oxide residues which can vary in number from about 3 to about 25. The various compounds can be derived by conventional procedures from a polyethylene glycol containing the appropriate number of ethylene oxide residues within the above range. For example, the compounds of group (i) wherein R is alkoxy or aryloxy can be obtained from the polyethylene glycol starting material by converting the latter to the corresponding mono-alkyl or aryl ether using etherification techniques well-known in the art, for example, by reacting the mono-sodium derivative of the glycol with the appropriate alkyl halide using the Williamson reaction, J. Chem. Soc. 4, 229, 1852. The mono-alkyl ether so obtained is then propoxylated by reaction, generally in the presence of an alkali metal, with appropriate amount of propylene oxide residues within the range of about 2 to about 15. The conditions employed in the propoxylation can be any of those conventionally employed in the art; see, for example, U.S. Pat. No. 3,423,344. Similarly, those compounds of group (i) wherein R is carbalkoxy as hereinbefore defined can be prepared by converting the polyethylene glycol starting material to the corresponding monoester by esterification with the appropriate mono-carboxylic acid or acid halide under conditions well-recognized in the art for such esterification. The resulting mono-ester is then propoxylated in the manner described above.

The compounds of group (ii) are prepared from the polyethylene glycol starting material by propoxylation using the appropriate amount of propylene oxide to give the desired number of residues. The propoxylation conditions are as described above.

While all the above types of hydroxyl-containing compounds can be used in preparing the isocyanate compositions of the invention, we prefer to use the compounds of type (ii) and more particularly prefer to use compounds of this type in which the number of ethylene oxide residues is of the order of about 14 to about 22 and the total number of propylene oxide residues is of the order of about 4 to about 10.

In a particularly preferred embodiment of the invention the hydroxyl-containing compounds employed to make the emulsifiable isocyanates are those of type (ii) which have a molecular weight in the range of about 1200 to about 1400 and contain from about 20 to about 50 percent by weight of propylene oxide residues.

As set forth above, the isocyanate compositions, which are prepared by reaction of the polymethylene polyphenyl polyisocyanates and the hydroxyl-containing compounds, are stable on storage over prolonged periods of time, i.e. do not show any significant tendency to decrease in isocyanate content or change in any other manner to any significant degree. Further, the compositions, even after prolonged storage, are readily emulsifiable when admixed with water. The aqueous emulsions so obtained are themselves sufficiently stable over a period of several hours to permit their employment, for any of the various uses to which they can be applied, over an extended period without risk of loss of isocyanate content or emulsifiability. This is in contrast to the behaviour of a number of emulsified polyisocyanates previously available many of which had to be employed substantially immediately after formation of the emulsion if serious degradation of the isocyanate was to be avoided.

The aqueous emulsions so prepared are useful as adhesives for a wide variety of purposes and the above stability behaviour is an important finding in this regard. In particular, the aqueous emulsions derived from the isocyanate compositions of the invention are useful as binders for the formation of particle board, wafer board, and the like, from cellulosic particulate material and the like. The fact that the emulsions remain stable and usable over a period of several hours represents a particular advantage for the reasons discussed above. The methods by which polyisocyanate binders, including aqueous emulsions of polyisocyanates, are employed in the preparation of particle boards are already described fully in the art cited supra, particularly in U.S. Pat. No. 4,257,995, the disclosures of which in this regard are specifically incorporated by reference herein.

Generally speaking, the emulsions derived from the emulsifiable isocyanates of the invention are prepared by dispersion of the latter, using appropriate mechanical agitation if necessary, in an amount of water within the range of about 50 to about 1000 parts by weight per 100 parts by weight of isocyanate composition. The precise amounts of water used in any given instance will depend upon the particular use to which the resulting emulsion is to be applied. Where the emulsion is to be used as a binder in the formation of particle boards and the like, it is generally preferred to employ compositions in which the amount of water is within the range of about 100 to about 500 parts by weight per 100 parts by weight of isocyanate composition.

It is noteworthy that, in contrast to prior art emulsions of polyisocyanates, the emulsions produced in accordance with the present invention do not require the use of additional materials such as surfactants, stabilizing agents and the like, in order to maintain stability of the emulsion.

The following examples describe the manner and process of making and using the invention and set forth the best mode contemplated by the inventors of carrying out the invention but are not to be construed as limiting.

Example 1

An emulsifiable isocyanate was prepared by admixing 100 parts by weight of polymethylene polyphenyl polyisocyanate [isocyanate equivalent =137; viscosity at 25° C.=180 cps: containing approximately 42 percent by weight of methylenebis(phenyl isocyanate)] and 3 parts by weight of a block copolymer of ethylene oxide and propylene oxide comprising a polyethylene glycol having 17 ethylene oxide residues capped with 8 moles of propylene oxide and having an equivalent weight of 1200. The mixture was heated, with stirring, at 50° C. for 2 hours before being cooled to room temperature (circa 20° C.). The isocyanate composition so obtained was found to have an isocyanate equivalent of 140.

A sample of the isocyanate composition (1 g.) was emulsified by shaking with 3 ml. of water. The isocyanate content of the emulsion was tested immediately after mixing and again 35 minutes after mixing and, finally, 3 hours after mixing. The sample at 35 minutes showed retention of 96 percent of the original isocyanate content and that at 3 hours showed 83 percent of the original isocyanate content. The emulsion showed no signs of separation at the end of the 3 hour period.

The above experiment was repeated but increasing the proportion of block copolymer to 5 parts by weight. An emulsion was prepared by shaking 1 g. of the composition with 3 ml. of water. The resulting emulsion showed no sign of separation after standing for 3 hours.

Example 2

Using the procedure described in Example 1 and employing the same block copolymer in the same proportion (3 parts by weight of block copolymer and 100 parts of polyisocyanate) but varying the viscosity and methylenebis(phenyl isocyanate) content of the polyisocyanate there were obtained four emulsifiable isocyanate compositions in accordance with the invention. The polyisocyanate starting material and the isocyanate equivalent (I.E.), viscosity and methylenebis(phenyl isocyanate) [MDI] content of the four products is shown in TABLE I below.

TABLE I

| Product no. | Polyisocyanate starting material | I.E. | Viscosity cps at 25° C. | Diisocyanate content % w/w |
|---|---|---|---|---|
| 2-1 | A[1] | 140.8 | 209 | 39.7 |
| 2-2 | B[2] | 141.6 | 432 | 37.8 |
| 2-3 | C[3] | 144.1 | 830 | 34.5 |
| 2-4 | D[4] | 145.7 | 1282 | 33.2 |

Footnotes:
[1]Same polyisocyanate as in Example 1.
[2]Polymethylene polyphenyl polyisocyanate: I.E. = 138; viscosity = 350 cps. at 25° C.; methylenebis(phenyl isocyanate) content = 41%.
[3]Polymethylene polyphenyl polyisocyanate: I.E. = 140; viscosity = 667 cps. at 25° C.; MDI content = 38%.
[4]Polymethylene polyphenyl polyisocyanate: I.E. = 142; viscosity = 1084 cps. at 25° C.; MDI content = 36%.

Samples of each of the above compositions were emulsified by dispersion in water (3 ml. per gram of isocyanate composition) and the resulting emulsions showed no sign of separation after 3 hours.

Example 3

A series of samples of wood particle board was prepared using the following procedure from the components and quantities of components (all parts by weight).

The woodchips (60% softwood, 40% hardwood; 1759 g.) were placed in a "Loedige batch mixer" and mixed, while the particles were sprayed with the aqueous emulsion of the polyisocyanate which emulsion had been prepared by stirring by hand the emulsifiable isocyanate (102 g.) with water (163 g.). The emulsion was sprayed through a pneumatic atomizing nozzle on the wood particles while mixing for 2 minutes with the mixer running at 1000 rpm to achieve homogeneity. The coated particles were formed into a felted mat on a 50×60 cm. cold rolled steel plate (which was pretreated with Wurtz T36/NE, an external release agent) with the aid of a plywood forming frame. After removal of the forming frame, steel bars, having a thickness corresponding to the desired thickness (10 mm) of the final particle board, were placed along two opposing edges of the aforesaid steel plate and a second 50×60 cm. steel plate was placed on top of the mat. The complete assembly was then placed on the lower platen of a hot press having a capacity of 280 tons of force. Both plates of the press were preheated to 180° C. temperature. The press then was closed and held for 120 sec. At the expiry of the molding time the pressure was released and the particle board was demolded.

Using the above procedure particle boards were prepared using each of the emulsifiable isocyanates described in Example 2. In all cases the boards so obtained had excellent physical properties comparable to those obtained using the original polyisocyanates (i.e. the free polyisocyanate not converted to the emulsifiable form) in accordance with prior art processes.

What is claimed is:

1. An isocyanate composition capable of yielding an emulsion on admixture with water said composition comprising the product of reaction of
   (a) a polymethylene polyphenyl polyisocyanate containing from about 10 to about 90 percent by weight of methylenebis(phenyl isocyanate) the remainder of said polyisocyanate comprising oligomeric polymethylene polyphenyl polyisocyanates of functionality greater than 2.0; and
   (b) from 0.001 to 0.2 equivalents, per equivalent of said polyisocyanate, of a hydroxyl containing compound selected from the class consisting of
   (i) at least one compound having the formula $$R^1-(CH_2CH_2O)_{3-25}-R^2 \qquad (I)$$

wherein $R^1$ represents a group selected from the class consisting of alkoxy, carbalkoxy, aryloxy and

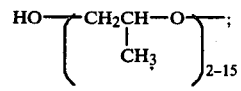

and
$R^2$ represents a group having the formula

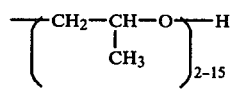

2. An isocyanate composition according to claim 1 wherein the polymethylene polyphenyl polyisocyanate contains from about 25 to about 65 percent by weight of methylenebis(phenyl isocyanate) the remainder of said polyisocyanate comprising oligomers of functionality greater than 2.0.

3. An isocyanate composition according to claim 1 wherein the hydroxyl containing compound is a diol having an average structure represented by the formula:

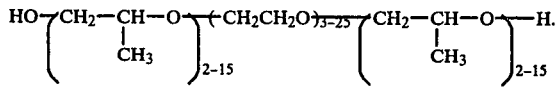

4. An isocyanate composition according to claim 3 wherein said diol has a molecular weight of the order of about 1200 to 1400 and the percentage by weight of propylene oxide residues is from about 20 to about 50.

5. A composition adapted for use as a binder for the preparation of particle board said composition comprising an aqueous emulsion derived by dispersing in water an isocyanate composition according to claim 1.

6. In a process for the preparation of a composite board wherein particles of organic material capable of being compacted are contacted with polyisocyanate binder composition and the treated particles are subsequently formed into boards by the application of heat and pressure, the improvement which comprises employing as the polyisocyanate binder composition an aqueous emulsion derived by dispersing in water an isocyanate composition in accordance with claim 1.

* * * * *